Jan. 5, 1965  M. J. LEWIS  3,164,751
BY-PASS ARRANGEMENT FOR A METER
Filed May 15, 1962  3 Sheets-Sheet 1
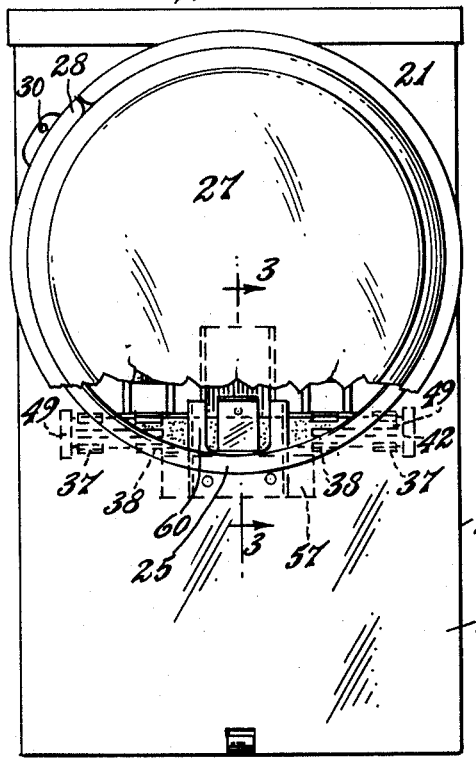
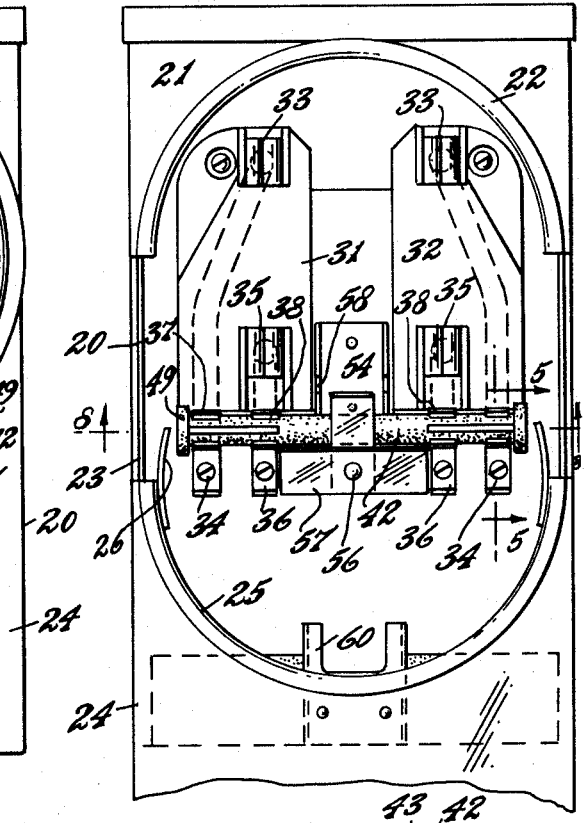
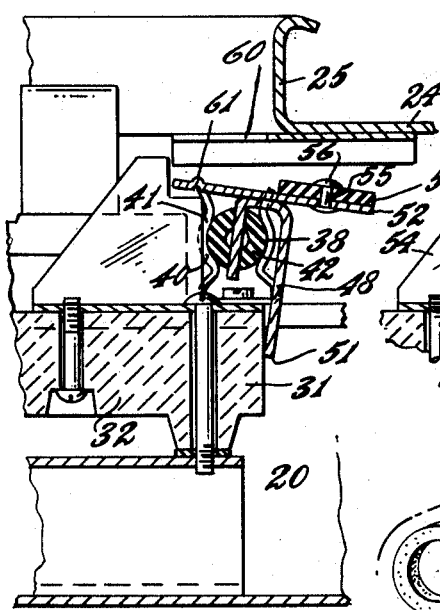
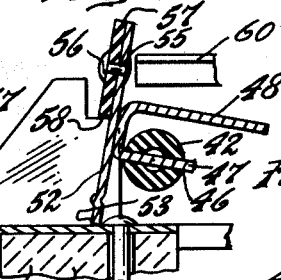
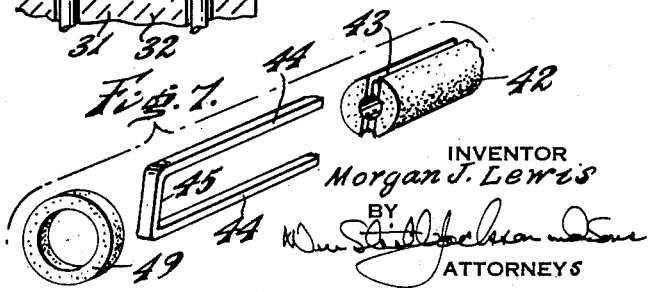
INVENTOR
Morgan J. Lewis
BY
ATTORNEYS Jan. 5, 1965  M. J. LEWIS  3,164,751
BY-PASS ARRANGEMENT FOR A METER
Filed May 15, 1962  3 Sheets-Sheet 2
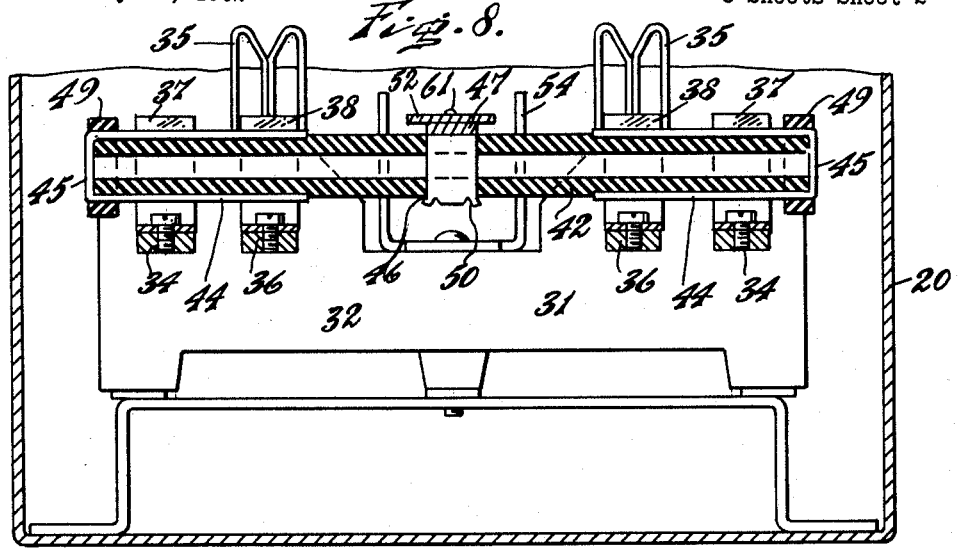
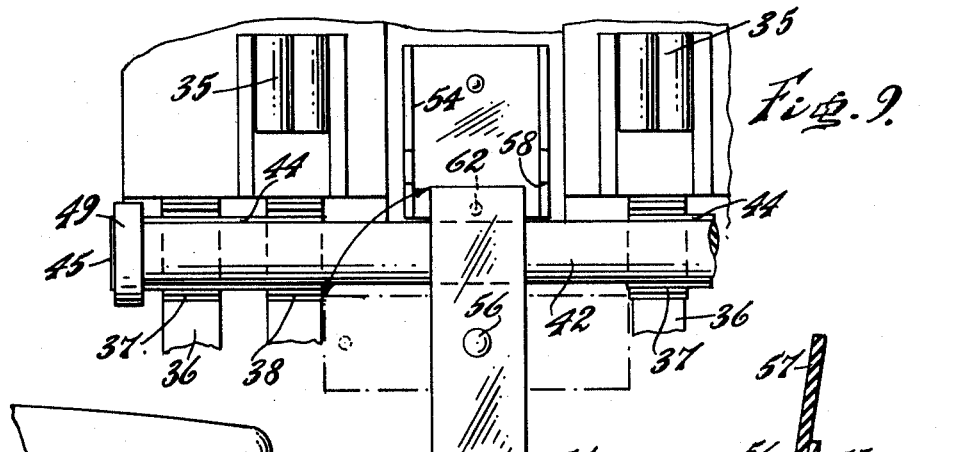
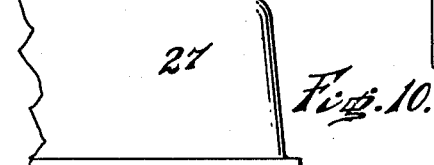
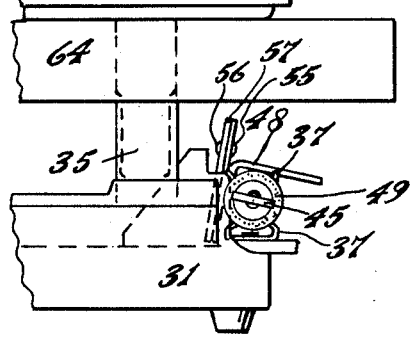
INVENTOR
Morgan J. Lewis
BY
ATTORNEYS Jan. 5, 1965 M. J. LEWIS 3,164,751
BY-PASS ARRANGEMENT FOR A METER
Filed May 15, 1962 3 Sheets-Sheet 3
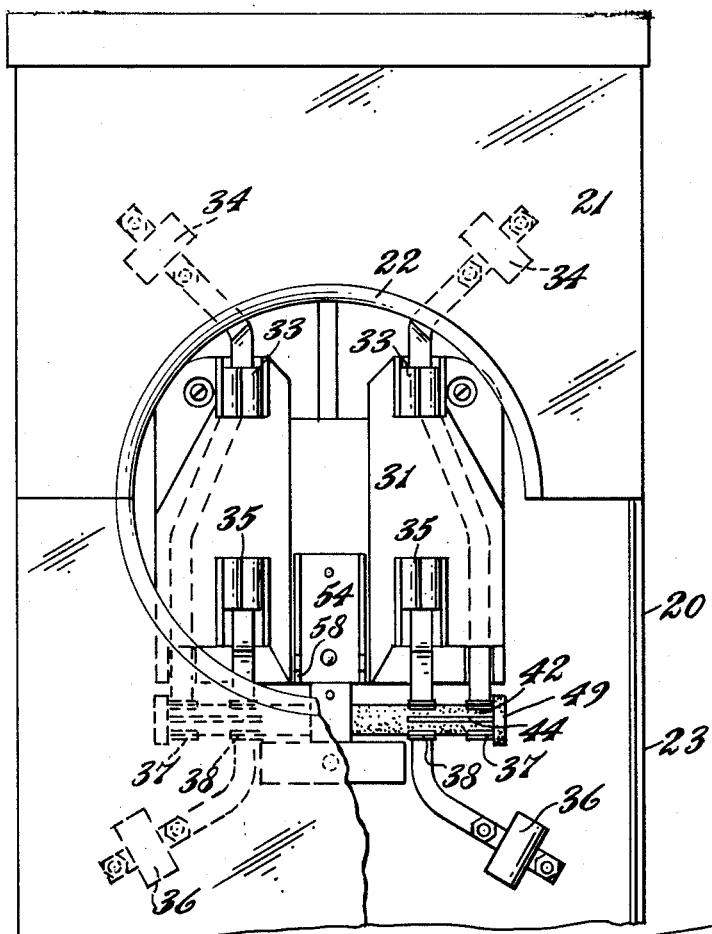
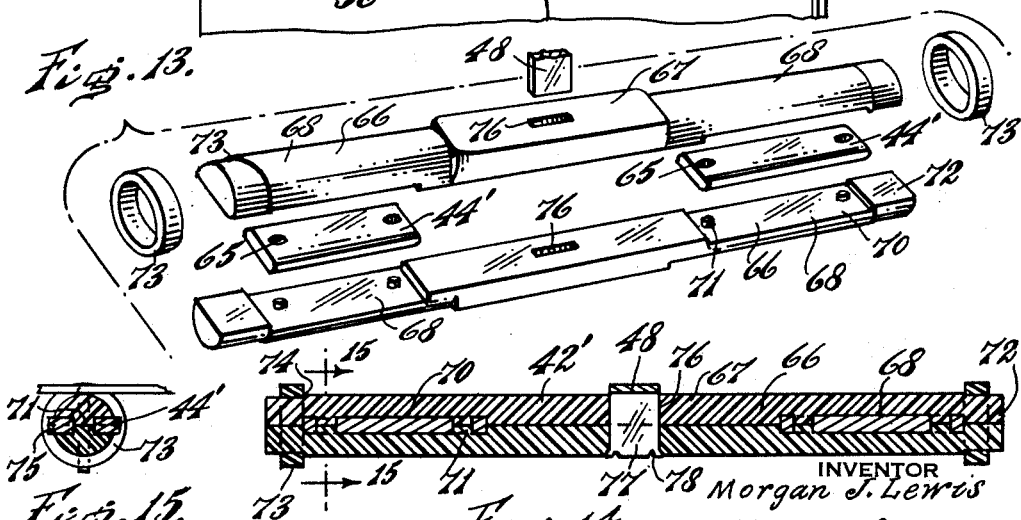
INVENTOR
Morgan J. Lewis
BY
ATTORNEYS

United States Patent Office 3,164,751
Patented Jan. 5, 1965

3,164,751
BY-PASS ARRANGEMENT FOR A METER
Morgan J. Lewis, 147 Righter St., Philadelphia 28, Pa.
Filed May 15, 1962, Ser. No. 194,764
7 Claims. (Cl. 317—108)

The present invention relates to watt hour meter boxes for electric distribution purposes.

A purpose of the invention is to facilitate shorting of the line and load on opposite sides of a watt hour meter box to permit receipt of power at the house or other installation without flowing through the meter, as for the purpose of construction before the meter is installed, or to permit removing a meter without interrupting service or to permit testing a meter.

A further purpose is to provide a bypass or shorting rotor operating in a line of spring clips, each clip being connected to one of the line or load jaws of the meter mounting, and to provide a shorting bar between each line and load clip which in one angular position of the rotor will short or bypass the meter at that side of the line and in another angular position will leave the meter operating in circuit normally.

A further purpose is to limit the angular rotation of the rotor so that in one position it will bypass and in another position it will not bypass the meter.

A further purpose is to provide a handle on the rotor which cannot move into or remain in bypassing position when the cover of the meter box is closed to avoid unintended or improper bypassing of the meter.

A further purpose is to provide a rotatable handle on the rotor which in one position can manipulate the rotor when the meter box cover is removed to bypass when the meter is in position, and in another position can rotate the rotor to bypass when a jack is in position, but which in no case can remain in bypassed position when the cover is closed.

Further purposes appear in the specification and in the claims.

In the drawings I have chosen to illustrate a few only of the numerous embodiments in which the invention may appear, selecting the forms shown from the standpoints of illustration, satisfactory operation and clear demonstration of the principles involved.

FIGURE 1 is a front elevation of a meter box according to the invention with either a meter or a face enclosure in position, and the cover closed and the socket locking ring in place, broken away, however, to show the bypass device of the invention.

FIGURE 2 is a front elevation of the device of FIGURE 1 with the meter removed and the sealing socket ring removed and the lower portion of the cover partially removed.

FIGURE 3 is an enlarged fragmentary section on the line 3—3 of FIGURE 1, showing the cover closed and the bypass in non-bypass position.

FIGURE 4 is a view similar to FIGURE 3 but showing the bypass in bypassing position.

FIGURE 5 is a fragmentary enlarged section on the line 5—5 of FIGURE 2, showing the shorting bar in non-bypassing position as illustrated in FIGURE 3.

FIGURE 6 is a view similar to FIGURE 5 but showing the shorting bar in bypassing position similar to FIGURE 4.

FIGURE 7 is a fragmentary exploded perspective of the rotor of the invention.

FIGURE 8 is an enlarged fragmentary section on the line 8—8 of FIGURE 2.

FIGURE 9 is an enlarged fragmentary top plan view of the device about to move into position to install a jack.

FIGURE 10 is a fragmentary side elevation of the device of FIGURE 9 with a jack installed and the meter in place and the bypass operating.

FIGURE 11 is an enlarged central axial section showing the rotor in the bypass position for use with the jack of FIGURE 10.

FIGURE 12 is a fragmentary top plan view of a modified form of the device of the invention.

FIGURE 13 is an exploded perspective partially broken away showing a variant form of shorting bar for use in the invention.

FIGURE 14 is an axial section of the shorting bar of FIGURE 13 duly assembled.

FIGURE 15 is a section on the line 15—15 of FIGURE 14.

Meter boxes have been developed by me which have a socket ring which is separable and is attached to the meter box cover, one part of the socket ring being removable with the cover. See, for example, my U.S. Patents 2,548,540, 2,582,638, 2,592,299 and 2,691,693, to which the reader is referred for a basic understanding of watt hour meter boxes under discussion.

There may be a need in many installations for bypassing the meter without breaking the circuit to the electric subscriber, so as not to disrupt the service of the customer on electric refrigerators, oil burners, electric clocks, and other timing devices and equipment where continuous service is important.

In order to meet this need, many electric service men carry special bypass jumpers made of electric cable or of copper bar jumpers which will permit bypassing the meter without interrupting service. Unfortunately, these jumpers must be available in numerous sizes which will fit each manufacturer design of meter box. It is, therefore, rather cumbersome to carry the requisite number of different types of jumpers and sometimes tedious to install them in order to maintain service.

The device of the invention provides a simple form of bypass attachment which can provide bypass of the meter when it is properly required, without at the same time permitting illegal use of the bypass, for example, to steal electric power.

Thus, the bypass of the invention can be legitimately utilized by an electric contractor making an initial installation in order to test his electric lines and in order to operate electric drills and other installation equipment.

The device of the invention can also be used to permit the removal of the meter for testing without interrupting the service.

The device of the invention can also be used to permit the installation of a meter testing jack and the testing of the meter on the meter testing jack without interrupting service.

At the same time the device of the invention does not permit reinstalling the meter while maintaining the bypass.

Considering now the drawings in detail, in the form of FIGURES 1 to 11, I illustrate a conventional meter box of the type shown in the patents above referred to having a meter box body 20, having side, end and rear walls, as shown and having a top cover 21 as well known provided with a portion, suitably half, of the socket ring 22 to which the meter will be locked. Sliding on guides 23 as well known, the box has a bottom cover 24 which has mounted thereon the lower half 25 of the socket ring to which the meter will be sealed and the interlocking prongs 26 as well known. When the cover is closed, as shown in FIGURE 1, the meter or face cover 27 has a locking ring 28 which engages around the socket ring and prevents unauthorized entry. A suitable seal or lock can be applied at 30 to hold the locking ring 28 in place.

Within the meter is a jaw mounting 31 for the meter of well known type consisting of an insulating base 32 having jaw connectors 33 which are connected to the line by suitable terminals and leads 34 and jaw connectors 35 connected to the load by suitable terminals and leads 36. All of this will suitably be conventional and no attempt is made to describe the well known jaw mounting and terminal arrangement for a meter box which is commonly employed in the art.

Unlike the usual practice, however, each line jaw connector 33 is electrically connected to a spring clip 37 and each load jaw connector 35 is electrically connected to a spring clip 38 and all of these spring clips are on a common axis as shown so that a common rotor can extend through them. Each spring clip has opposed jaws 40 which have opposed cooperating arcuate portions 41 best seen in FIGURES 3, 5 and 6 which are adapted to hold in rotatable relation a bypass rotor 42 which as shown consists of an electrically insulating tube which extends clear across from one side to the other and is journalled by the spring clips 37 and 38 so that it remains capable of rotation.

Near each end and on opposite sides the tube 42 has longitudinal slots 43 best seen in FIGURE 7, into which U-shaped arms of a shorting bar 44 suitably of copper or other high conductivity material can extend. The length of the shorting bar at each end is adequate to extend from the line clip 37 to the load clip 38 and it then terminates. The shorting bar has the base 45 of the U at the end which aids in distributing current if contact is not equal on the two sides.

The bypass rotor 42 has an annular ring 49 of suitable insulating material fitted over the rotor at each end which holds the shorting bar 44 in place on the rotor.

The rotor has two positions. In one position, as shown in FIGURE 5, it does not bypass and is electrically ineffective because the shorting bar does not contact either arcuate portion of the spring clips 37 and 38. In the opposite position, at right angles to that of FIGURE 5, as shown in FIGURE 6, each shorting bar 44 engages both arcuate portions 41 spring clips 37 and 38 on one side only of the line and shorts the meter out of the circuit since the line and load connections at each side are separately bypassed.

The shorting bar, suitably at the middle, has a slot extending transversely through it at 46 which receives an elongated tongue 47 of a handle bracket 48 best seen in FIGURES 3, 4 and 11. The handle bracket 48 makes a force fit in the rotor 42 and is anchored as by staking at 50 as shown in FIGURE 8.

In one position when the bypass is ineffective, the handle bracket 48 limits rotation of the rotor 42 in the particular direction by engagement with a side of the meter socket as shown at 51 in FIGURE 3.

Mounted rigidly, as by welding, on the handle bracket 48 is a handle support 52 extending transversely to the rotor axis. At the limiting position where bypass takes place, handle support 52 limits further rotation at 53 by tending to engages the bottom of a stop bracket 54 mounted on the meter socket.

The handle support 52 has an opening at 55 which receives a pivot rivet 56 which mounts an insulating handle 57. The insulating handle 57 has two positions. In the position where the insulating handle is longitudinal, it may function as follows:

(1) When the handle is depressed, the shorting bar is electrically inoperative as shown in FIGURES 1, 2, 3 and 5.

(2) Where the handle is raised, the shorting bars can short at the two sides as shown in FIGURES 4 and 6, but the handle cannot be raised while the meter is in place unless the lower meter cover is removed as there would be interferences with the lower meter cover as suggested at 60 in FIGURE 4.

(3) The handle can be raised as shown in FIGURE 10 when a test jack 64 is in place and the meter can be inserted in the test jack.

When it is desired to use a cover glass over the meter opening, in order to avoid interferences with the cover glass which is relatively high but does not permit wide extension of the horizontal handle, the insulating handle 57 must be shifted to position transverse to the axis as shown in FIGURE 11.

It will be noted that when the shorting bar is operative and the insulating handle is longitudinal with respect to the axis, the insulating handle engages a stop 58 as shown in FIGURE 4 which limits the motion counterclockwise in that figure.

As noted above, the interlock fork 60 projecting from the lower cover prevents the bypass remaining closed when the lower cover is closed to apply the locking ring around the meter. Therefore, the bypass cannot operate except when the meter box is open.

To rotate the insulating handle 57 in order to bring it to the transverse position as shown in FIGURE 11, it is merely necessary to pull the handle around until the recess 62 enters detent 61 on handle support 52. The handle will then be held in its transverse position in this case the lower end of the handle limits rotation at 63 against the stop bracket 54 as shown in FIGURE 11. The upstanding insulating handle in the position of FIGURE 11 permits the use of a cover glass which is of bell shape, but does not permit installation of a meter without turning the shorting bars to electrically inoperative position.

Some jacks have interior bypasses and therefore after the jack and meter are installed as shown in FIGURE 10, the insulating handle 57 can be moved to the non-bypass position while in other cases there is no internal bypass and the bypass in the meter box must be used throughout the test program.

The form of FIGURE 12 differs merely in that the terminals 34 and 36 are differently placed but the device of the invention can otherwise be similar. In this case, however, the interlock fork 60 has been found to be unnecessary because it would not be possible to leave the device in bypass position when the meter and meter locking ring are in proper place.

It will thus be evident that the device has four positions. The handle 57 can be in longitudinal position or in transverse position. The bypass can be in electrically operative position or in electrically ineffective position.

As far as the electrically ineffective position, the handle can be either longitudinal or transverse and in this position the meter can be fully inserted, the jack can be used, or the cover glass over the meter opening can be employed.

When the handle is in bypass position, one of the following things must be true:

(1) The handle can be longitudinal or transverse but the meter cannot be installed and the bottom cover closed.

(2) The handle can be in longitudinal position and the jack can be inserted as in FIGURE 10.

(3) The handle can be in transverse position and the cover glass can be inserted.

The device will therefore be foolproof and will not permit stealing electric current.

FIGURES 13, 14 and 15 show a variant form of shorting bar assembly which consists of solid strip shorting bars 44' for mounting at the opposite ends and for exposure at the edges of the assembly. The shorting bars have opposite openings 65.

A molded insulating element 66 is provided at each side of the shorting bars and this has a suitably squared center portion 67 and half almost round end portions 68 which have longitudinal recesses 70 for receiving and hugging the shorting bars which have plastic lugs or dampers 71 extending into the opening 65 of the shorting bars.

Toward the end of the shorting bar assembly there are abutments 72 which meet and cooperate on the opposite halves as best seen in FIGURE 14, and the entire assembly is held together by suitable resilient plastic bands 73 which make a force fit on the outside of the halves of the plastic elements 66 and are limited by shoulders 74 which prevent the bands from slipping on too far where they would interfere with the electrical contact made by the projecting edge portions 75 of the shorting bars 44'.

A slot 76 extends through the halves of the insulation material and receives an extended tongue 77 on the handle bracket 48, which is bent as shown in the preferred forms and staked at 78 at the outer end to prevent withdrawal.

Thus the halves of the insulation meter and the shorting bars are held into a suitable assembly both by the handle bracket 48 at the center and by the ring 3 at the outer ends.

The device will be used in initial installation of the meter box for the convenience of the contractor before the meter is installed, and also in various forms of meter testing.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. An electric watt hour meter box having plug sockets for a meter, a cover separated and provided with separated portions of a socket ring for uniting to the meter, and bypass conductors connected to the meter plug sockets including electric line terminals and load terminals, in combination with a shorting device comprising a set of aligned spring clips connected respectively to the bypass electric line terminals and load terminals, said clips being adapted to receive and support a rotor element, the rotor element extending throughout the line of spring clips and having insulation for preventing current flow from one set of line and load terminals to the other set and also preventing current flow across from the line to the load in either side in one position of rotation of the rotor, separate shorting bar means positioned longitudinally at each side of the rotor element and extending from each line to each load connection in one angular position of the rotor, and handle means connected to the rotor and adapted to manipulate the rotor between a position in which the line and load at each side are not cross connected and a position at which the line and load of each side are cross connected.

2. A meter box of claim 1, in which the shorting bar means is effective at both sides of the rotor to engage both sides of each spring clip when the rotor is turned to shorting position.

3. A meter box of claim 1, in combination with limiter means for limiting rotation of the rotor in one direction to a position at which the line and load are not shorted and limiter means for limiting the position in the opposite direction to the position in which the line and load are shorted.

4. A meter box of claim 2, in combination with limiter means for limiting rotation of the rotor in one direction to a position at which the line and load at each side is not shorted and limiter means for limiting the rotation of the rotor in the other direction to a position at which the line and load are shorted.

5. A meter box of claim 1, in combination with means on the cover for preventing the handle from turning to shorting position when the cover is closed.

6. A meter box of claim 4, in combination with means on the cover for preventing turning the handle to turn the rotor to shorting position when the cover is closed.

7. A meter box of claim 1, in which the handle is rotatable with respect to the axis of the rotor so that it has a longitudinal position in which it cannot be raised when the meter is in place and the meter assembly complete, and a transverse position in which it can be raised when a cover glass is in place.

References Cited in the file of this patent
UNITED STATES PATENTS

| | | |
|---|---|---|
| 2,691,693 | Lewis | Oct. 12, 1954 |
| 2,982,828 | Foskett | May 2, 1961 |
| 3,003,085 | Rund | Oct. 3, 1961 |